(12) United States Patent
Greenberger et al.

(10) Patent No.: US 10,586,537 B2
(45) Date of Patent: Mar. 10, 2020

(54) FILTERING DIRECTIVE INVOKING VOCAL UTTERANCES

(71) Applicant: International Business Machines Corporation, Armonk, NY (US)

(72) Inventors: Jeremy A. Greenberger, Raleigh, NC (US); Nicholas R. Sandonato, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 86 days.

(21) Appl. No.: 15/827,662

(22) Filed: Nov. 30, 2017

(65) Prior Publication Data

US 2019/0164545 A1    May 30, 2019

(51) Int. Cl.
| | | |
|---|---|---|
| *G10L 15/22* | (2006.01) | |
| *G10L 15/26* | (2006.01) | |
| *G10L 15/06* | (2013.01) | |
| *G10L 15/08* | (2006.01) | |
| *G06F 9/451* | (2018.01) | |
| *G10L 15/07* | (2013.01) | |
| *G10L 15/01* | (2013.01) | |

(52) U.S. Cl.
CPC .............. *G10L 15/22* (2013.01); *G06F 9/451* (2018.02); *G10L 15/01* (2013.01); *G10L 15/063* (2013.01); *G10L 15/075* (2013.01); *G10L 15/08* (2013.01); *G10L 15/26* (2013.01); *G10L 15/265* (2013.01); *G10L 2015/0638* (2013.01); *G10L 2015/223* (2013.01)

(58) Field of Classification Search
CPC .......... G10L 15/063; G10L 2015/0638; G10L 15/065; G10L 15/07; G10L 15/075; G10L 15/01; G10L 15/22; G10L 15/26; G10L 15/265

See application file for complete search history.

(56) References Cited

U.S. PATENT DOCUMENTS 4,972,485 A * 11/1990 Dautrich ................. G10L 15/07
704/242
5,987,411 A * 11/1999 Petroni ................. G10L 15/063
704/238

(Continued)

*Primary Examiner* — Eric Yen
(74) *Attorney, Agent, or Firm* — Christopher Pignato, Esq.; George S. Blasiak, Esq.; Heslin Rothenberg Farley & Mesiti, PC

(57) ABSTRACT

Methods, computer program products, and systems are presented. The method computer program products, and systems can include, for instance: receiving, from a user, voice data defining a candidate directive invoking vocal utterance for invoking a directive to execute a first text based command to perform a first computer function of a computer system, wherein the candidate directive invoking vocal utterance includes at least one word or phrase of the text based command, wherein the computer system is configured to perform the first computer function in response to the first text based command and wherein the computer system is configured to perform a second computer function in response to a second text based command; determining, based on machine logic, whether a word or phrase of the candidate vocal utterance sounds confusingly similar to a speech rendering of a word or phrase defining the second text based command.

20 Claims, 11 Drawing Sheets

(56) References Cited

U.S. PATENT DOCUMENTS

| | | | | |
|---|---|---|---|---|
| 6,134,527 A | * | 10/2000 | Meunier | G10L 15/063 704/239 |
| 6,535,850 B1 | * | 3/2003 | Bayya | G10L 15/07 704/239 |
| 6,813,603 B1 | * | 11/2004 | Groner | G10L 15/26 704/235 |
| 7,266,498 B1 | | 9/2007 | Connelly | |
| 8,380,514 B2 | * | 2/2013 | Bodin | G10L 15/22 704/270 |
| 9,280,973 B1 | * | 3/2016 | Soyannwo | G10L 15/30 |
| 2002/0174177 A1 | * | 11/2002 | Miesen | H04M 3/4281 709/203 |
| 2003/0069729 A1 | * | 4/2003 | Bickley | G10L 15/08 704/236 |
| 2011/0288867 A1 | * | 11/2011 | Chengalvarayan | G10L 15/063 704/251 |
| 2015/0127347 A1 | | 5/2015 | Tjalve et al. | |

* cited by examiner

250

```
┌─────────────────────────────────────────────────────────────────────┐
│ RECEIVING, FROM A USER, ENTERED TEXT THAT SPECIFIES A CANDIDATE     │
│ RESOURCE NAME FOR A RESOURCE OF A COMPUTER SYSTEM, WHEREIN THE      │── 254
│ COMPUTER SYSTEM IS CONFIGURED TO EXECUTE A TEXT BASED COMMAND THAT  │
│ REFERENCES AN EXISTING RESOURCE NAME OF A RESOURCE OF THE COMPUTER  │
│ SYSTEM IN RESPONSE TO A DIRECTIVE INVOKED BY A DIRECTIVE INVOKING   │
│ VOCAL UTTERANCE THAT SPECIFIES THE EXISTING RESOURCE NAME           │
└─────────────────────────────────────────────────────────────────────┘
                                   ↓
┌─────────────────────────────────────────────────────────────────────┐
│ DETERMINING, BASED ON MACHINE LOGIC, WHETHER A SPEECH RENDERING OF  │── 258
│ THE ENTERED TEXT SOUNDS CONFUSINGLY SIMILAR TO A SPEECH RENDERING OF│
│ THE EXISTING RESOURCE NAME OF THE COMPUTER SYSTEM                   │
└─────────────────────────────────────────────────────────────────────┘
                                   ↓
┌─────────────────────────────────────────────────────────────────────┐
│ RESPONSIVE TO THE DETERMINATION THAT THE SPEECH RENDERING OF THE    │
│ ENTERED TEXT SOUNDS CONFUSINGLY SIMILAR TO A SPEECH RENDERING OF AN │── 262
│ EXISTING RESOURCE NAME OF THE COMPUTER SYSTEM                       │
└─────────────────────────────────────────────────────────────────────┘
                                   ↓
┌─────────────────────────────────────────────────────────────────────┐
│ COMMUNICATING, TO THE USER, INFORMATION INDICATING THAT THE SPEECH  │── 266
│ RENDERING OF THE ENTERED TEXT SOUNDS CONFUSINGLY SIMILAR TO A SPEECH│
│ RENDERING OF AN EXISTING RESOURCE NAME OF THE COMPUTER SYSTEM       │
└─────────────────────────────────────────────────────────────────────┘
                                   ↓
┌─────────────────────────────────────────────────────────────────────┐
│ RESPONSIVE TO THE COMMUNICATION OF INFORMATION INDICATING THAT THE  │
│ SPEECH RENDERING OF THE ENTERED TEXT SOUNDS CONFUSINGLY SIMILAR TO A│── 270
│ SPEECH RENDERING OF AN EXISTING RESOURCE NAME OF THE COMPUTER       │
│ SYSTEM RECEIVING, FROM THE USER, SECOND ENTERED TEXT SPECIFYING A   │
│ SECOND CANDIDATE RESOURCE NAME FOR THE RESOURCE                     │
└─────────────────────────────────────────────────────────────────────┘
```

FIG. 2B

FILTERING DIRECTIVE INVOKING VOCAL UTTERANCES

BACKGROUND

Speech recognition is the translation of spoken words to text and, more particularly, it is the computer-driven transcription of spoken language into readable text in real-time. Speech recognition systems are rapidly increasing in significance in many areas of data and communications technology. In recent years, speech recognition has advanced to the point where it is used by millions of people across various applications. Speech recognition applications now include interactive voice response systems, voice dialing, data entry, dictation mode systems including medical transcription, automotive applications, etc. There are also "command and control" applications that utilize speech recognition for controlling tasks such as adjusting the climate control in a vehicle or requesting a smart phone to play a particular song.

SUMMARY

Shortcomings of the prior art are overcome, and additional advantages are provided, through the provision, in one aspect, of a method. The method can include, for example: receiving, from a user, voice data defining a candidate directive invoking vocal utterance for invoking a directive to execute a first text based command to perform a first computer function of a computer system, wherein the candidate directive invoking vocal utterance includes at least one word or phrase of the text based command, wherein the computer system is configured to perform the first computer function in response to the first text based command and wherein the computer system is configured to perform a second computer function in response to a second text based command; determining, based on machine logic, whether a word or phrase of the candidate vocal utterance sounds confusingly similar to a speech rendering of a word or phrase defining the second text based command; responsive to the determination that that the word or phrase of the candidate directive invoking vocal utterance sounds confusingly similar to the speech rendering of the word or phrase defining the second text based command, communicating, to the user, information indicating that the word or phrase of the candidate directive invoking vocal utterance sounds confusingly similar to the speech rendering of the word or phrase defining the second text based command; and responsive to the communication of information indicating that the word or phrase of the candidate directive invoking vocal utterance sounds confusingly similar to the speech rendering of the word or phrase defining the second text based command receiving, from the user, a second candidate directive invoking vocal utterance for invoking the directive to execute the first text based command to perform the first computer function of a computer system.

In another aspect, a computer program product can be provided. The computer program product can include a computer readable storage medium readable by one or more processing circuit and storing instructions for execution by one or more processor for performing a method. The method can include, for example: receiving, from a user, voice data defining a candidate directive invoking vocal utterance for invoking a directive to execute a first text based command to perform a first computer function of a computer system, wherein the candidate directive invoking vocal utterance includes at least one word or phrase of the text based command, wherein the computer system is configured to perform the first computer function in response to the first text based command and wherein the computer system is configured to perform a second computer function in response to a second text based command; determining, based on machine logic, whether a word or phrase of the candidate vocal utterance sounds confusingly similar to a speech rendering of a word or phrase defining the second text based command; responsive to the determination that that the word or phrase of the candidate directive invoking vocal utterance sounds confusingly similar to the speech rendering of the word or phrase defining the second text based command, communicating, to the user, information indicating that the word or phrase of the candidate directive invoking vocal utterance sounds confusingly similar to the speech rendering of the word or phrase defining the second text based command; and responsive to the communication of information indicating that the word or phrase of the candidate directive invoking vocal utterance sounds confusingly similar to the speech rendering of the word or phrase defining the second text based command receiving, from the user, a second candidate directive invoking vocal utterance for invoking the directive to execute the first text based command to perform the first computer function of a computer system.

In a further aspect, a system can be provided. The system can include, for example a memory. In addition, the system can include one or more processor in communication with the memory. Further, the system can include program instructions executable by the one or more processor via the memory to perform a method. The method can include, for example: receiving, from a user, voice data defining a candidate directive invoking vocal utterance for invoking a directive to execute a first text based command to perform a first computer function of a computer system, wherein the candidate directive invoking vocal utterance includes at least one word or phrase of the text based command, wherein the computer system is configured to perform the first computer function in response to the first text based command and wherein the computer system is configured to perform a second computer function in response to a second text based command; determining, based on machine logic, whether a word or phrase of the candidate vocal utterance sounds confusingly similar to a speech rendering of a word or phrase defining the second text based command; responsive to the determination that that the word or phrase of the candidate directive invoking vocal utterance sounds confusingly similar to the speech rendering of the word or phrase defining the second text based command, communicating, to the user, information indicating that the word or phrase of the candidate directive invoking vocal utterance sounds confusingly similar to the speech rendering of the word or phrase defining the second text based command; and responsive to the communication of information indicating that the word or phrase of the candidate directive invoking vocal utterance sounds confusingly similar to the speech rendering of the word or phrase defining the second text based command receiving, from the user, a second candidate directive invoking vocal utterance for invoking the directive to execute the first text based command to perform the first computer function of a computer system.

Shortcomings of the prior art are overcome, and additional advantages are provided, through the provision, in one aspect, of a method. The method can include, for example: receiving, from a user, entered text that specifies a candidate resource name for a resource of a computer system, wherein the computer system is configured to execute a text based command that references an existing resource name of a resource of the computer system in response to a directive invoked by a directive invoking vocal utterance that specifies the existing resource name; determining, based on machine logic, whether a speech rendering of the entered text sounds confusingly similar to a speech rendering of the existing resource name of the computer system; responsive to the determination that the speech rendering of the entered text sounds confusingly similar to a speech rendering of an existing resource name of the computer system; communicating, to the user, information indicating that the speech rendering of the entered text sounds confusingly similar to a speech rendering of an existing resource name of the computer system; and responsive to the communication of information indicating that the speech rendering of the entered text sounds confusingly similar to a speech rendering of an existing resource name of the computer system receiving, from the user, second entered text specifying a second candidate resource name for the resource.

In another aspect, a computer program product can be provided. The computer program product can include a computer readable storage medium readable by one or more processing circuit and storing instructions for execution by one or more processor for performing a method. The method can include, for example: receiving, from a user, entered text that specifies a candidate resource name for a resource of a computer system, wherein the computer system is configured to execute a text based command that references an existing resource name of a resource of the computer system (for example, a file name identifying a file) in response to a directive invoked by a directive invoking vocal utterance that specifies the existing resource name; determining, based on machine logic, whether a speech rendering of the entered text sounds confusingly similar to a speech rendering of the existing resource name of the computer system; responsive to the determination that the speech rendering of the entered text sounds confusingly similar to a speech rendering of an existing resource name of the computer system; communicating, to the user, information indicating that the speech rendering of the entered text sounds confusingly similar to a speech rendering of an existing resource name of the computer system; and responsive to the communication of information indicating that the speech rendering of the entered text sounds confusingly similar to a speech rendering of an existing resource name of the computer system receiving, from the user, second entered text specifying a second candidate resource name for the resource.

In a further aspect, a system can be provided. The system can include, for example a memory. In addition, the system can include one or more processor in communication with the memory. Further, the system can include program instructions executable by the one or more processor via the memory to perform a method. The method can include, for example: receiving, from a user, entered text that specifies a candidate resource name for a resource of a computer system, wherein the computer system is configured to execute a text based command that references an existing resource name of a resource of the computer system in response to a directive invoked by a directive invoking vocal utterance that specifies the existing resource name; determining, based on machine logic, whether a speech rendering of the entered text sounds confusingly similar to a speech rendering of the existing resource name of the computer system; responsive to the determination that the speech rendering of the entered text sounds confusingly similar to a speech rendering of an existing resource name of the computer system; communicating, to the user, information indicating that the speech rendering of the entered text sounds confusingly similar to a speech rendering of an existing resource name of the computer system; and responsive to the communication of information indicating that the speech rendering of the entered text sounds confusingly similar to a speech rendering of an existing resource name of the computer system receiving, from the user, second entered text specifying a second candidate resource name for the resource.

Shortcomings of the prior art are overcome, and additional advantages are provided, through the provision, in one aspect, of a method. The method can include, for example: receiving a plurality of computer readable speech renderings respectively corresponding to content of a plurality of text based commands; receiving a candidate audio data set with the candidate audio data set including: (i) an identification of a first text based command that is not included in the plurality of text based commands, and (ii) audio data corresponding to a candidate speech rendering; comparing, by machine logic, the candidate speech rendering to each of the computer readable speech renderings to determine that speech recognition software is likely to misidentify the candidate speech rendering as corresponding to a speech rendering of the plurality of computer readable speech renderings; and responsive to the determination that speech recognition software is likely to misidentify the candidate speech rendering, taking a responsive action.

In another aspect, a computer program product can be provided. The computer program product can include a computer readable storage medium readable by one or more processing circuit and storing instructions for execution by one or more processor for performing a method. The method can include, for example: receiving a plurality of computer readable speech renderings respectively corresponding to content of a plurality of text based commands; receiving a candidate audio data set with the candidate audio data set including: (i) an identification of a first text based command that is not included in the plurality of text based commands, and (ii) audio data corresponding to a candidate speech rendering; comparing, by machine logic, the candidate speech rendering to each of the computer readable speech renderings to determine that speech recognition software is likely to misidentify the candidate speech rendering as corresponding to a speech rendering of the plurality of computer readable speech renderings; and responsive to the determination that speech recognition software is likely to misidentify the candidate speech rendering, taking a responsive action.

In a further aspect, a system can be provided. The system can include, for example a memory. In addition, the system can include one or more processor in communication with the memory. Further, the system can include program instructions executable by the one or more processor via the memory to perform a method. The method can include, for example: receiving a plurality of computer readable speech renderings respectively corresponding to content of a plurality of text based commands; receiving a candidate audio data set with the candidate audio data set including: (i) an identification of a first text based command that is not included in the plurality of text based commands, and (ii) audio data corresponding to a candidate speech rendering; comparing, by machine logic, the candidate speech rendering to each of the computer readable speech renderings to determine that speech recognition software is likely to misidentify the candidate speech rendering as corresponding to a speech rendering of the plurality of computer readable speech renderings; and responsive to the determination that speech recognition software is likely to misidentify the candidate speech rendering, taking a responsive action.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 2B is a flowchart illustrating a method that can be performed by a VEPA according to one embodiment;

DETAILED DESCRIPTION

Figure 1:
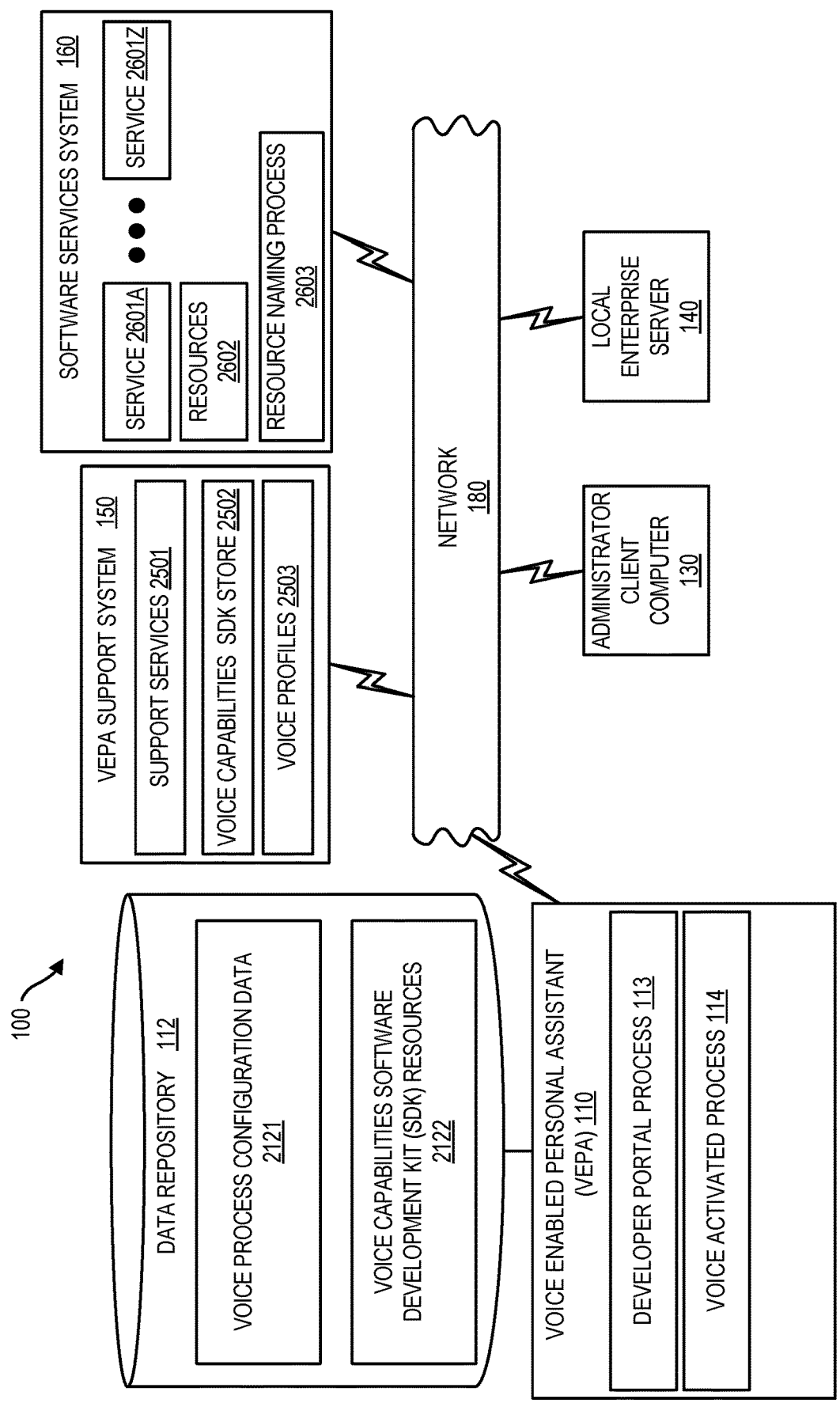
FIG. 1 is a block diagram of a system have a voice enabled personal assistant (VEPA), a VEPA support system, and a software services system according to one embodiment.

System 100 for use in support of voice activated processes is set forth in FIG. 1. System 100 can include voice enabled personal assistant (VEPA) 110, administrator client computer 130, local enterprise server 140, VEPA support system 150, and software services system 160 which can be in communication with one another via network 180. VEPA 110 can include an associated data repository 112.

System 100 can include numerous devices which may be computing node based devices connected by and in communication with one another by network 180. Network 180 may be a physical network or a virtual network. A physical network can include for example, a physical telecommunications network connecting numerous computing nodes or systems, such as computer servers and computer clients. A virtual network can, for example combine numerous physical networks or parts thereof into a logical virtual network. In another example, numerous virtual networks can be defined over a single physical network.

In one embodiment, VEPA 110 can be external to and remote from administrator client computer 130, local enterprise server 140, VEPA support system 150, and software services system 160. In one embodiment, VEPA 110 can be co-located with one or more of administrator client computer 130, local enterprise server 140, VEPA support system 150, and/or software services system 160. Administrator client computer 130 can be used by a human administrator of system 100.

VEPA 110 can run various processes including developer portal process 113, which can support development of code that configures a voice activated process. VEPA 110 can also run one or more voice activated process 114 based on code developed using developer portal process 113.

VEPA 110 can be configured to support one or more voice activated process 114. In one example, a voice activated process 114 can be a process wherein a directive is invoked in response to a vocal utterance of a user. In one embodiment, a directive invoked by a vocal utterance can be responded to by a service as will be set forth in greater detail herein.

Data repository 112 of VEPA 110 can store various data, such as voice process configuration data stored in voice process configuration data area 2121, developed for support in configuration of various voice activated processes. Data repository 112 can also store voice capabilities software development kit (SDK) resources into voice capabilities SDK resources area 2122.

For running of developer portal process 113, VEPA 110 can use resources of voice capabilities SDK resources area 2122. VEPA 110 can support a plurality of different voice activated processes. Voice activated processes can be developed e.g. for control of home appliances, home climate control, home video equipment, voice activation of purchase transactions, e.g. with retail or restaurant establishments, and voice activated music listening services. Different voice capabilities SDK resources that are stored in voice capabilities SDK resources area 2122 can be provided for the development and support of different classifications of voice processes. For example, development of several different voice activated processes, e.g. for control of home appliances, might be developed and supported with use of a voice capabilities SDK resources of voice capabilities SDK resources area 2122 optimized for home related voice activated processes. A plurality of home video related voice activated processes can be developed and supported with use of voice capabilities SDK resources of voice capabilities SDK resource area 2122 optimized for support of video related voice activated processes. Additional voice capabilities SDK resources can be added to voice capabilities SDK resources area 2122 of data repository 112 (e.g. downloaded from an SDK store as set forth herein) to increase the capacities and classifications of voice activated processes that are supported.

Administrator client computer 130 in one embodiment can support an administrator user interface that facilitates administrator user defining of configuration data for use with VEPA 110 and e.g. with local enterprise server 140, VEPA support system 150, and/or software services system 160. System 100 in one embodiment can be used for support of services that are provided by software services system 160 and/or local enterprise server 140. System 100 can support the development and use of one or more voice activated process 114 that augments performance of software services system 160 and/or local enterprise server 140.

VEPA support system 150 can support functions of VEPA 110. VEPA support system 150 can be operated by an enterprise that provides VEPA 110. VEPA support system 150 can provide support services 2501 for support of operations by VEPA 110 and can include voice capabilities SDK store 2502. Using an administrator user interface of administrator client computer 130 an administrator user can view the contents of voice capabilities SDK store 2502 and download additional SDK resources into voice capabilities SDK resources area 2122 of VEPA. Support services 2501 provided by VEPA support system 150 can include such services as voice natural language processing (NLP) services for converting and processing of voice data that can be generated locally at VEPA 110 in response to vocalizations by users at the location of VEPA 110. VEPA support system 150 can include a voice profiles area 2503. In voice profiles area 2503, VEPA support system 150 can store data of voice tendencies of users of VEPA 110, based on use of VEPA 110 over time. System 100 can learn tendencies of a user's voice including, e.g. accent, volume, tone, inflection, and can use such classifications to recognize speech of the user.

Software services system 160 can make available a wide variety of services 2601A-2601Z. Examples of services include data analytics services, natural language processing (NLP) services, sentiment analysis services, visual recognition services, speech to text services, text to speech services, internet of things (IoT) support services, and application hosting services. In one embodiment, an administrator user using administrator client computer 130 can be an administrator user agent of an enterprise that operates local enterprise server 140 with augmented capabilities provided by software services system 160.

One service that can be included in the offerings defined by services 2601A-2601Z can be voice service 2601A which enables software services system 160 to respond by voice invoked directives received from VEPA 110.

Software services system 160 can include resources 2602. Resources 2602 can include in one embodiment a plurality of files stored in a plurality of directories. Resources 2602 can include files and directories that are accessible, e.g. with use of a subscriber ID, provided to licensed subscribers, e.g. subscribers to software services system 160 under a subscriber ID.

Software services system 160 can run resource naming process 2603 to support and guide the establishing of resource names accessible under a specified subscriber ID within software services system 160.

Embodiments herein recognize that an administrator user using administrator client computer configuring a variety of support services provided by software services system 160 as well as local enterprise server 140 may become overwhelmed with work and troubleshooting problems that may arise in the service offerings. To simplify and enhance support services, embodiments herein provide a voice activated process, wherein vocal utterances can invoke directives that can be responded to by a voice service 2601A of software services system 160 to augment the providing of services such as services of services 2601A-2601Z.

Embodiments herein can provide for example vocal utterance directives for execution of commands for performance of a computer system functions such as computer system functions provided by software services system 160 and/or local enterprise server 140. In one embodiment, system 100 can be configured so that in response to a directive invoking vocal utterance, a computer system command is executed. In one embodiment, system 100 can be configured so that in response to a directive invoking vocal utterance, a file or directory management command is executed. A file or directory management command herein is a command that specifies at least one command operator, and one or more resource where the resource can be a file or a directory. The file or directory management command can affect a resource, e.g. a file or directory of software services system 160 and/or local enterprise server 140.

System 100 can be configured so that a wide variety of commands can be executed via voice control to permit, for example an administrator user to be invoking the execution of commands via voice concurrently while entering commands via a text based administrator user interface or concurrently while handling hardware components of a network infrastructure. Embodiments herein recognize, however, that with advantages potentially accruing from such functionality involving execution of computer system commands based on directive invoking utterances there are significant risks. Embodiments herein recognize for example that with voice control, an unintended control can be implemented. Accordingly, embodiments herein include safeguards so that voice controls can be implemented with processing to assure system reliability and operability. Embodiments herein recognize that in computer system environments it is common to name multiple resources with resource names which if subject to speech rendering would sound confusingly similar, e.g. new resource names are commonly provided by interchanging lower case or upper case characters, adding characters (e.g. hyphens, symbols) without an associated vocalization to provide a new resource name, and the like.

In one embodiment, VEPA 110 can be provided, e.g., by an ALEXA® personal assistant (ALEXA® is a registered trademark of Amazon.com, Inc. Seattle, Wash.). In one embodiment, VEPA 110 can be provided by a HOMEPOD® intelligent personal assistant, available from Apple, Inc. (HOMEPOD is a registered trademark of Apple, Inc. of Cupertino, Calif.). Embodiments herein can provide functionality for use in the development of voice activated processes, wherein vocal utterances invoke directives to direct the execution of commands for performance of computer system functions such as file or directory management command functions.

In one embodiment for example, the provider of software services system 160 can make available in voice capabilities SDK store 2502 of VEPA support system 130 a specialized voice capabilities SDK for use in the development of voice activated processes, whereby vocal utterances can be used to invoke directives to direct execution of a wide range of computer system commands.

An example of commands include commands having command operators such as CHMOD, GZIP, GUNZIP, MKDIR, PWD, ATTRIB, CHDIR, COPY, DEL, DIR, ERASE, MD, MOVE, RMDIR, REN, RENAME, POPD, PUSHD, RD, REPLACE, TREE, RESTART, DEPLOY, DELETE, CHECK STATUS, and INCREASE MEMORY. Commands that can be executed herein based on vocal utterance invoked directives can include a command operator and a specified resource. For example, the command "CHDIR NEWDIRECTORY" herein, for commanding a computer system to change a current directory to the directory NEWDIRECTORY can be regarded to have the command operator "CHDIR" and a reference the directory resource "NEW DIRECTORY". The command DELETE MYAPP for commanding a computer system to delete the file named "MYAPP" can be regarded to have the command operator "DELETE" and a reference to the file resource named "MYAPP. Commands that can be executed herein based on vocal utterance invoked directives can include file or directory management commands. System 100 can be configured using configuration processes herein to execute the noted commands (and other commands) referencing one or more resource names of resources 2602.

Embodiments herein can include processes that are run to facilitate providing a reliable voice activated process to direct execution of computer system commands based on vocal utterances. Embodiments herein can employ features that are implemented, e.g. on software services system 160 or on VEPA 110 or both. For example, in one embodiment, software services system 160 can run a resource naming process that examines candidate text based resource names that are being entered via an administrator user interface by an administrator user and can perform processing to determine whether a candidate resource name, e.g. poses risk of being confused with another resource name when referenced in a command that is executed in response to a voice activated directive. VEPA 110 in one embodiment can run a developer portal process 113. With developer portal process 113 active candidate vocal utterances being evaluated for use as directive invoking vocal utterances are subject to processing to determine whether a candidate vocal utterance may reference a resource name other than an intended resource name.

Figure 2A:
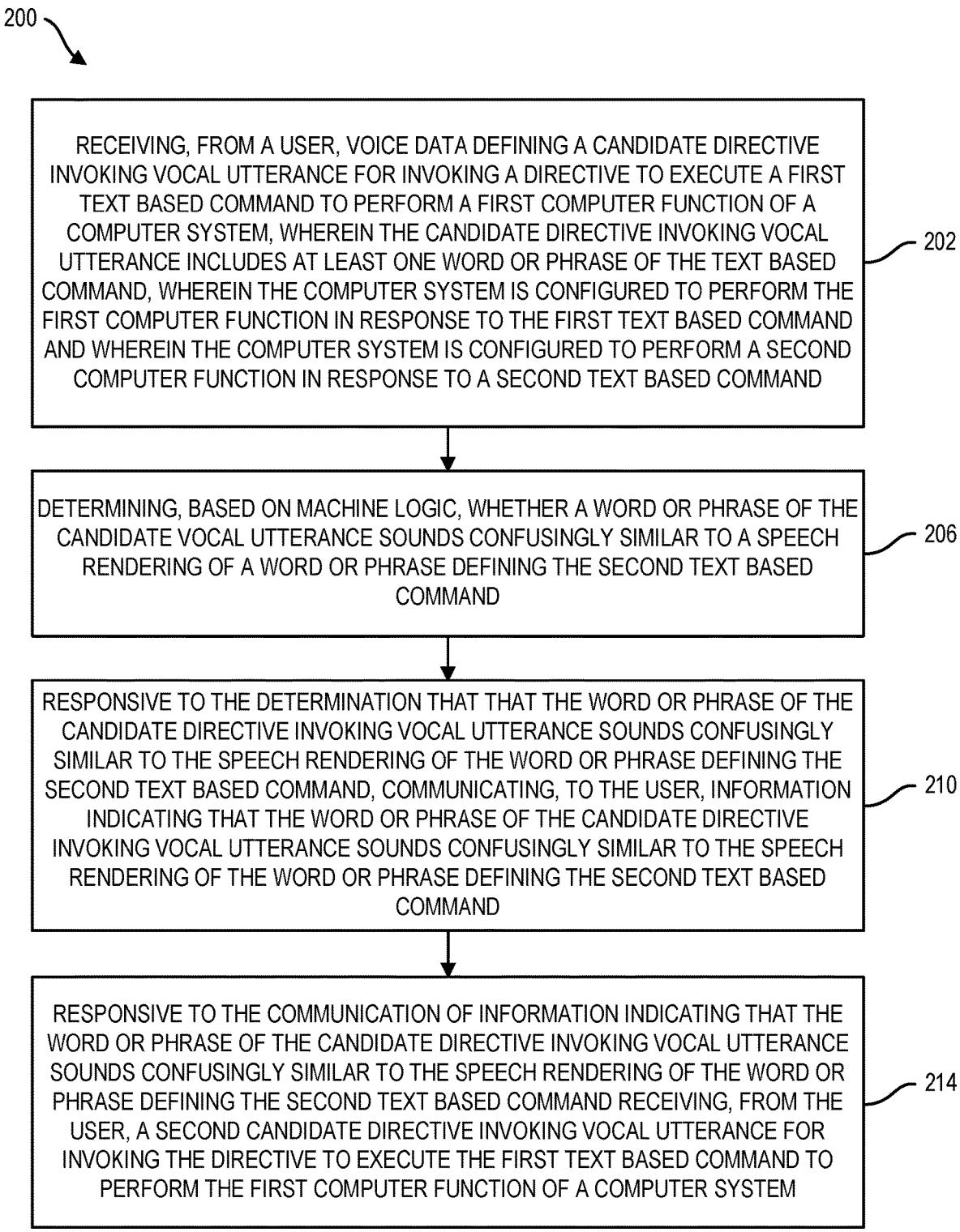
FIG. 2A is a flowchart illustrating a method that can be performed by a software services system according to one embodiment.

In reference to FIG. 2A, there is set forth a method 200, which can be performed, e.g. by a computing node based system such as software services system 160. Method 200 can include at block 202 receiving, from a user, voice data defining a candidate directive invoking vocal utterance for invoking a directive to execute a first text based command to perform a first computer function of a computer system, wherein the candidate directive invoking vocal utterance includes at least one word or phrase of the text based command, wherein the computer system is configured to perform the first computer function in response to the first text based command and wherein the computer system is configured to perform a second computer function in response to a second text based command. Method 200 can include at block 206 determining, based on machine logic, whether a word or phrase of the candidate vocal utterance sounds confusingly similar to a speech rendering of a word or phrase defining the second text based command. Method 200 can include at block 210 responsive to the determination that that the word or phrase of the candidate directive invoking vocal utterance sounds confusingly similar to the speech rendering of the word or phrase defining the second text based command, communicating, to the user, information indicating that the word or phrase of the candidate directive invoking vocal utterance sounds confusingly similar to the speech rendering of the word or phrase defining the second text based command. Method 200 can include at block 214 responsive to the communication of information indicating that the word or phrase of the candidate directive invoking vocal utterance sounds confusingly similar to the speech rendering of the word or phrase defining the second text based command receiving, from the user, a second candidate directive invoking vocal utterance for invoking the directive to execute the first text based command to perform the first computer function of a computer system.

Referring now to method 250 set forth in FIG. 2B method 200 can be performed, e.g. by a computing node based system such as VEPA 110. Method 250 can include at block 254 receiving, from a user, entered text that specifies a candidate resource name for a resource of a computer system, wherein the computer system is configured to execute a text based command that references an existing resource name of a resource of the computer system in response to a directive invoked by a directive invoking vocal utterance that specifies the existing resource name. Method 250 can include at block 258 determining, based on machine logic, whether a speech rendering of the entered text sounds confusingly similar to a speech rendering of the existing resource name of the computer system. Method 250 can include at block 262 responsive to the determination that the speech rendering of the entered text sounds confusingly similar to a speech rendering of an existing resource name of the computer system. Method 250 can include at block 266 communicating, to the user, information indicating that the speech rendering of the entered text sounds confusingly similar to a speech rendering of an existing resource name of the computer system. Method 250 can include at block 266 responsive to the communication of information indicating that the speech rendering of the entered text sounds confusingly similar to a speech rendering of an existing resource name of the computer system receiving, from the user, second entered text specifying a second candidate resource name for the resource.

Figure 3A:
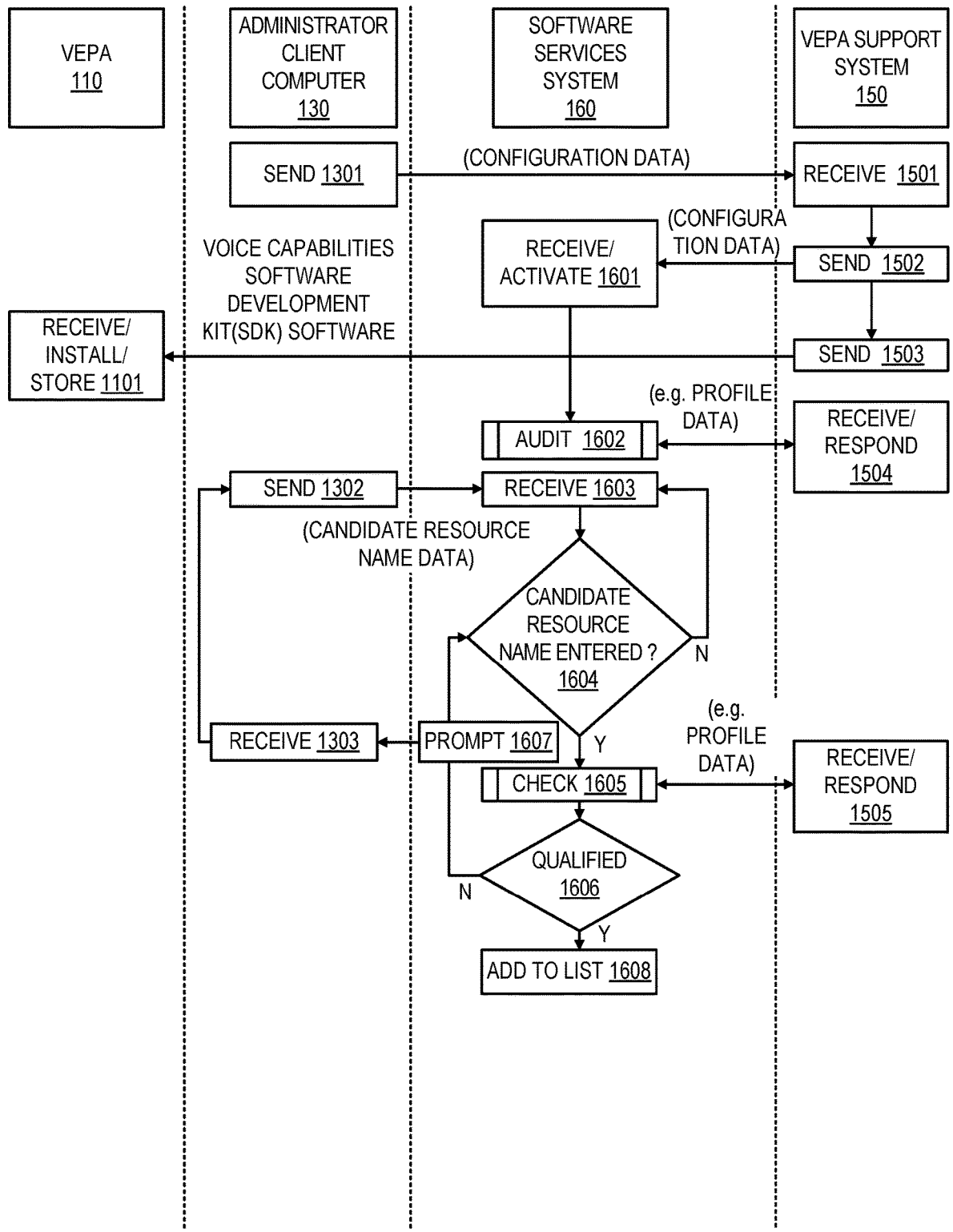
FIGS. 3A-3B are flowcharts illustrating a method that can be performed by interoperation of a software services system, a VEPA, an administrator client computer, and a VEPA support services system according to one embodiment.
Figure 3B:
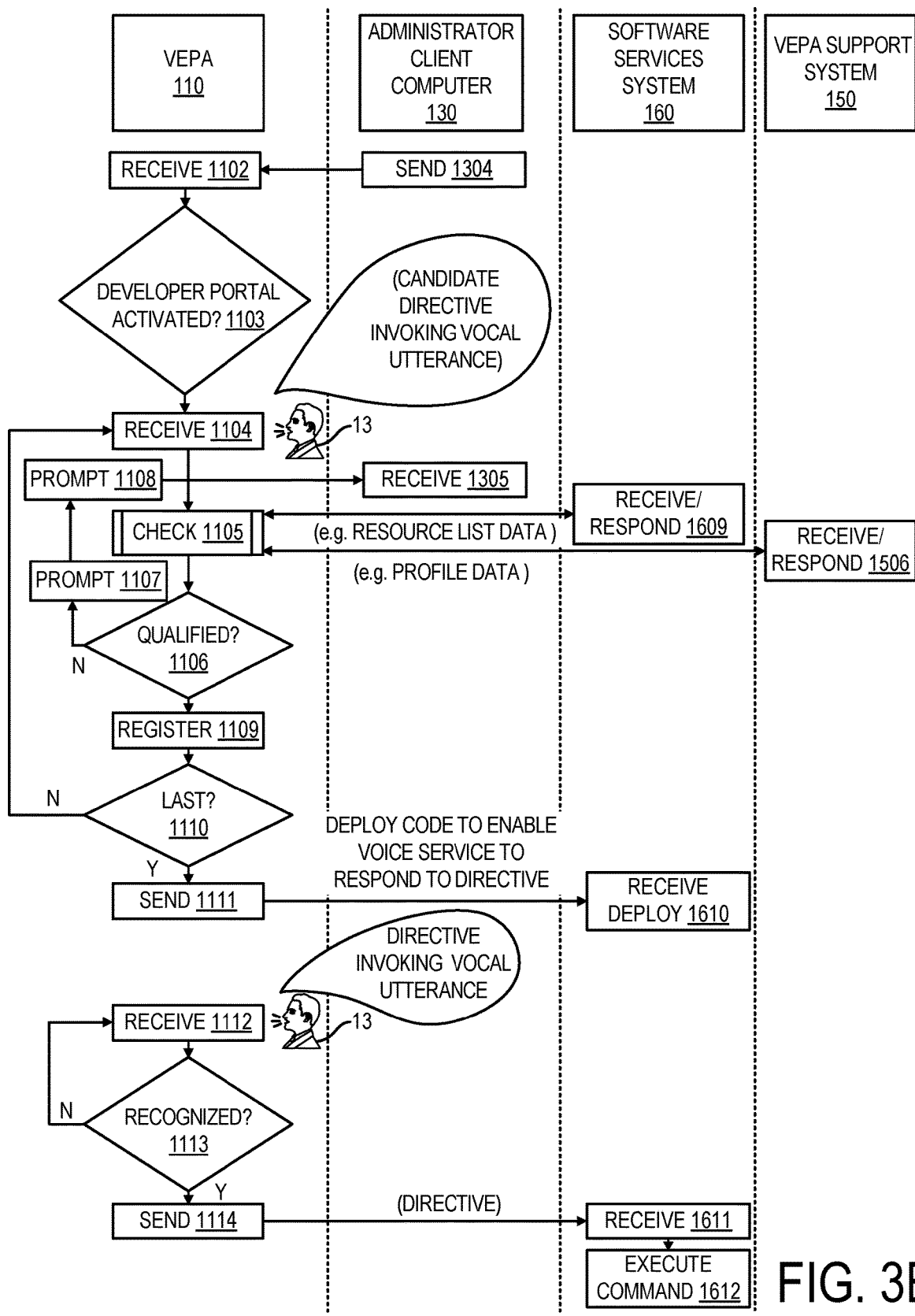

Examples that are in accordance with method 200 as described in connection with the flowchart of FIG. 2A and method 250 described in accordance with the flowchart of FIG. 2B are set forth in reference to FIGS. 3A and 3B, illustrating a method for performance by system 100 by way of interoperations between VEPA 110, administrator client computer 130, software services system 160, and VEPA support system 150. At block 1301, administrator client computer 130 can send configuration data for receipt by VEPA support system 150 at block 1501 to initiate downloading of software development kit (SDK) resources software for supporting development of a voice activated processes, wherein vocal utterances can invoke directives to direct execution of computer system commands such as file or directory management commands.

Referring to the flowchart of FIGS. 3A-3B, an administrator user using administrator client computer 130 can be using a web based user interface defined by webpages served by VEPA support system 150, in which SDK resources might be identified with a user-friendly indicator such as "VOICE COMMAND APP". On receipt of configuration data at block 1501, defining selection of the particularly noted SDK resources at block 1501, VEPA support system 150 can send the responsive communication at block 1502 to software services system 160 and responsively to the receipt at block 1501, can at block 1503, send SDK resources software for receipt, installation, and/or storage by VEPA 110 at block 1101. The responsive communication sent by VEPA support system 150 at block 1502 to software services system 160 can include configuration data that activates features of software services system 160 that are in support of voice activated computer system command execution featurization as set forth herein.

For example, receipt of the communication at block 1601 can activate resource naming process 2603 of software services system 160. Resource naming process 2603 can for example, invoke processes to audit resource names made available under a particular subscriber ID by software services system 160, e.g. so that a resource name reference in a computer system command that is voice invoked does not intentionally reference another resource name. Resource naming process 2603 can include a process that is iteratively run to check resource names of software services system 160 and can include a process that is run on demand, e.g. when an administrator user attempts to define a new resource name. Accordingly, at block 1602, software services system 160 can run an audit to check for the integrity of resource names supported by software services system 160 that are accessible to an administrator user of administrator client computer 130 under a particular subscriber ID and to address any potential conflicts. For example, a conflict can exist where a first resource name when subject to speech rendering sounds confusingly similar to a second resource name when subject to speech rendering. In such a situation, it can be anticipated that a first vocal utterance invoked directive for execution of a first computer system command referencing a first resource name may unintentionally result in execution of a second computer system command referencing a second resource name.

Figure 6:
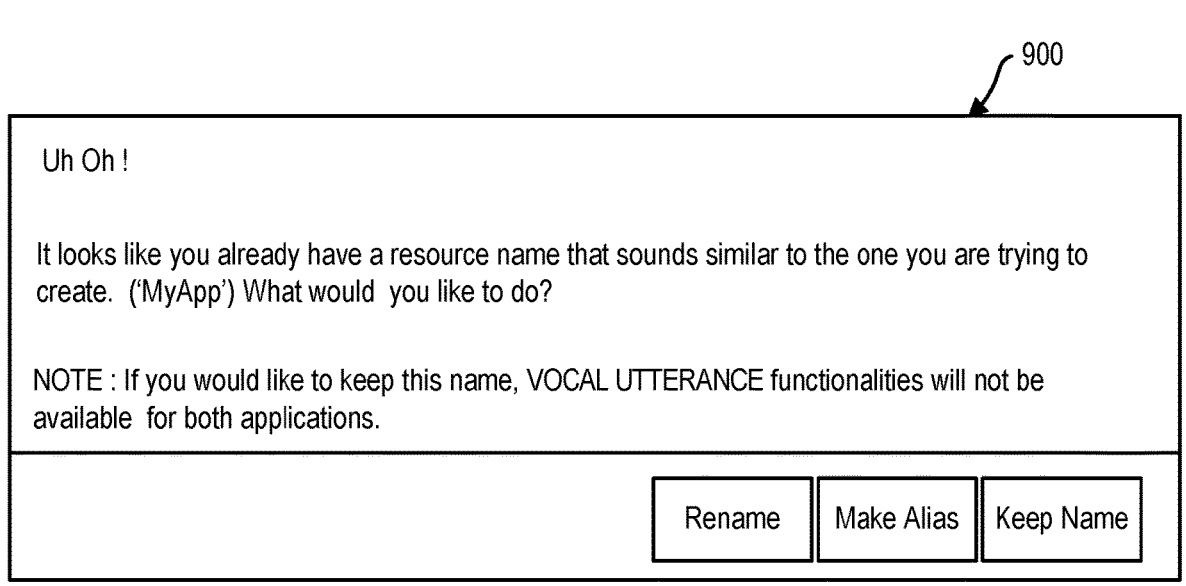
FIG. 6 depicts an administrator user interface according to one embodiment.

For performance of an audit at block 1602, software services system 160 can iteratively audit resource names available under a subscriber ID by software services system 160 and are capable of being referenced in a command that can be executed in response to a directive invoking vocal utterance. For performance of such check, software services system 160 at audit block 1602 can, e.g. though the lifetime of software services system 160 for as long as voice activated features, as set forth herein, are active, iteratively electronically synthesize speech renderings of resource names and perform comparisons between speech renderings of resource names that are capable of being referenced in an executed computer system command having a corresponding directive invoking vocal utterance. Based on the identification of a conflict, software services system 160 can provide a user interface prompt, e.g. a prompt having the characteristics as shown by administrator user interface 900 and described further in reference to FIG. 6 herein. Software services system 160 at audit block 1602 can audit resource names for conflicts with existing commands which system 100 can execute in response to vocal utterances and/or anticipated commands which system 100 can execute in response to vocal utterances.

As noted, resource naming features herein can in addition or alternatively be provided on demand. Referring further to the flowchart of FIG. 3 an on-demand resource name check process is described with reference to blocks 1603-1608 (describing operations of software services system 160) and blocks 1302-1303 (describing operations of administrator client computer 130).

Figure 4:
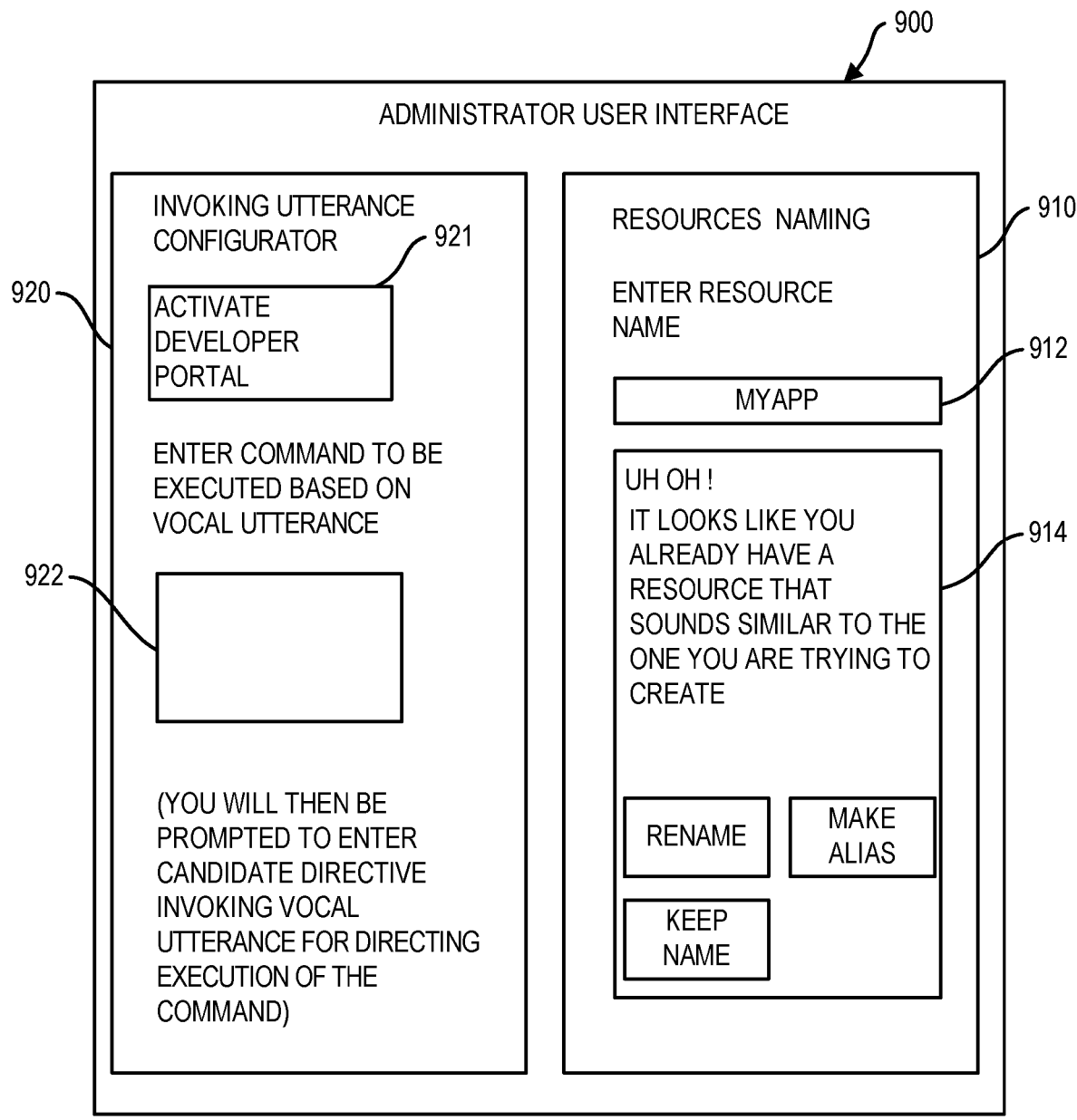
FIG. 4 depicts an administrator user interface according to one embodiment.

At blocks 1603 and 1604 software services system 160 can be waiting for administrator user to enter text defining a candidate (proposed) resource name for a new resource to be made available through a subscribed of software services system 160 under a subscriber ID. Referring to FIG. 4 at block 1302, an administrator user can be using an administrator user interface having characteristics of administrator user interface 900 as set forth in FIG. 4. Administrator user interface 900 can be a displayed user interface displayed on a display of administrator client computer 130. Administrator user interface 900 can be a manually operated administrator user interface. Using area 910, for example, an administrator user may be configuring resources for use under a subscriber ID and may be prompted at some point to enter a name of a resource such as a file name, e.g. in open fields area 912 of resource naming area 910 of administrator user interface 900. Referring to the flowchart of FIG. 3A, an administrator user at block 1302 can send candidate resource name data for receipt by software services system 160 at block 1603.

At block 1302 an administrator user can be entering text defining resource names, e.g. file names or directory names and at block 1603 software services system 160 can be receiving such entered text defining resources. On determining that a candidate resource name has been entered at block 1604, software services system 160 can proceed to block 1605 to process the candidate resource name and to identify any conflicts with existing names of resources available under a subscriber ID by software services system 160. For example, software services system 160 at block 1605 can examine names of all resources available under a subscriber ID and are capable of being referenced in a computer system command that can be executed in response to a directive invoking vocal utterance, e.g. a previously configured vocal utterance for providing a directive invoking vocal utterance that is capable of being defined using system 100.

On generating such a resource list at block 1605, software services system 160 running resource naming process 2603 can electronically synthesize speech renderings corresponding to the administrator user text entered and sent at block 1302 and can electronically synthesize speech renderings for each resource identified in a resource list based on resources of software services system 160 accessible under a subscriber ID. Software services system 160 can compare the electronically synthesized speech rendering for the entered text sent at block 1302 to the electronically synthesized speech rendering for each identified resource of the generated resource list provided by examining of resources 2602. The generating of speech renderings of entered text and identified resource names can be electronically synthesized speech rendering processes using a text to speech resource, e.g. which can be available on software services system 160.

The generating of a speech rendering of typed text and each file name can include electronically synthesizing speech renderings for each of the entered text and each identified resource name. Speech rendering processes to render speech from text can convert raw text containing symbols like numbers and abbreviations into the equivalent of written-out words. Phonetic transcriptions can be assigned to define symbolic linguistic representations of words which can be converted into sounds to synthesize input speech.

In one embodiment, IBM WATSON® (IBM WATSON® is a registered trademark of International Business Machines Corporation), text to speech service can be utilized. In one embodiment, the rendering can include electronically rendering without audibly rendering, e.g. comparing at block 1605 can include use of original data representation of each rendering without audio playback and rerecording.

Text rendering processes (text translations) can include phonetic renderings or sounds-like rendering. Sounds like translation leverages regular pronunciation rules to represent the desired pronunciation of a target word indirectly. A translation is formed from the regular pronunciations of one or more other words. The service first substitutes the specified translation for any occurrence of the word that appears in the input text. It then applies its regular pronunciation rules to the translation, converting the translation to its phonetic representation to obtain the desired pronunciation. Regular pronunciation rules properly translate some common abbreviations and acronyms. For example, the abbreviation cm can be pronounced as centimeter.

Checking at block 1605 can include providing a dissimilarity score between an electronically synthesized speech rendering of the entered text entered at block 1302 and a speech rendering of each identified resource name. Resource names having dissimilarity scores less than a threshold can be flagged as presenting potential conflicts. For example, referring to administrator user interface 900 of FIG. 4, where the candidate resource name "MYAPP" is entered, software services system 160 at block 1605 can identify the existing resource name "MyApp" as presenting a potential conflict. Software services system 160 at block 1606 can determine if the entered candidate resource name is qualified, i.e. which can occur in the case that no conflicting resource names are identified by the check process at block 1605. On qualification of the resource name, the resource name can be added to a qualified list of resource names at block 1606 and the resource can be named in software services system 160 according to the designation by the administrator user at block 1302.

Figure 5:
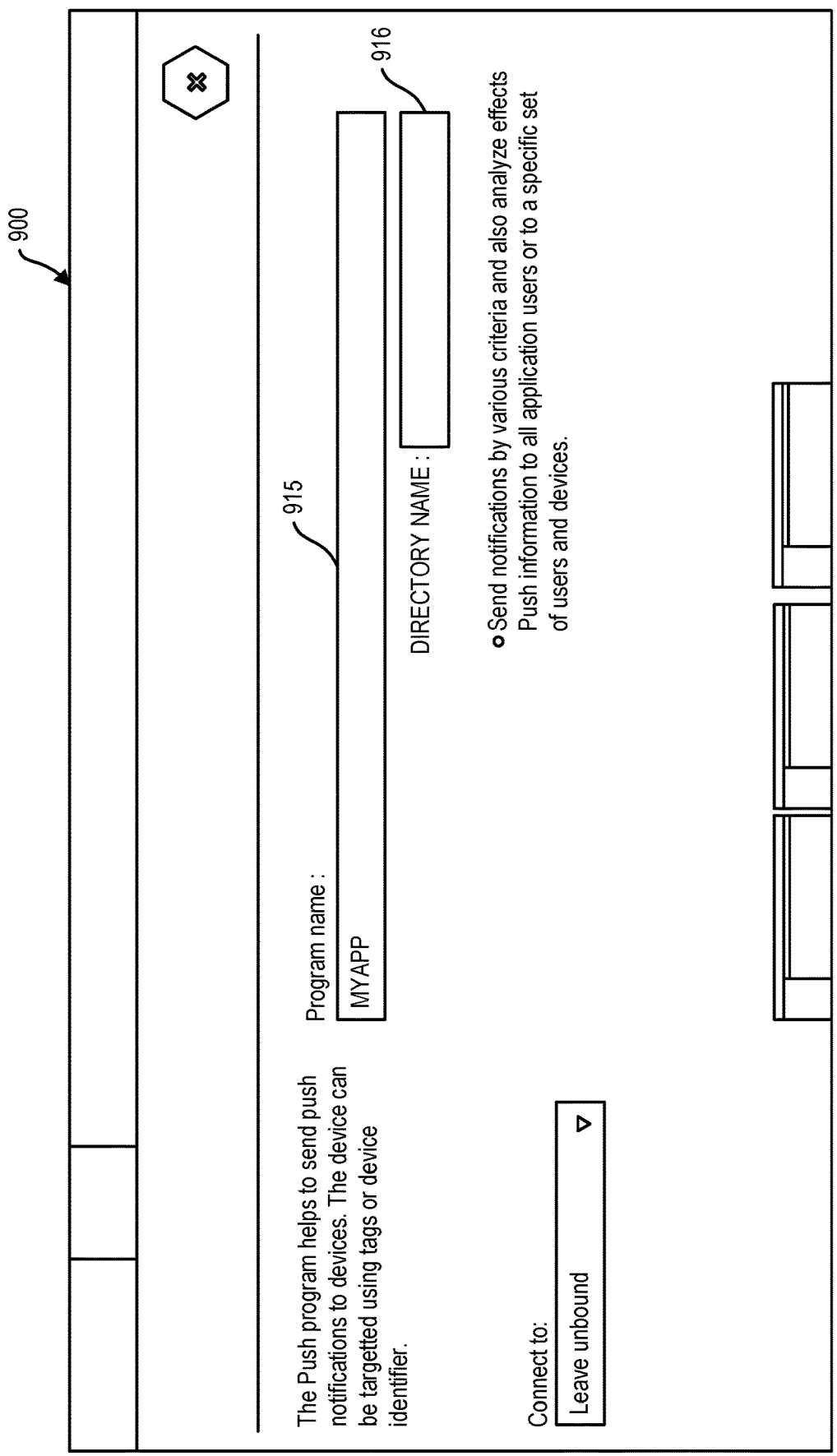
FIG. 5 depicts an administrator user interface according to in one embodiment.

If on the other hand, the candidate entered resource name defined by entered text at block 1302 is not qualified, e.g. a conflict is identified, software services system 160 can proceed to block 1607 to activate a prompt and can return to block 1604 to wait for entry of new text defining an alternate candidate resource name. The prompt activated at block 1607 can be received by administrator client computer 130 at block 1303. On receipt of the prompt defining data at block 1303, administrator client computer 130 can display at block 1303 on administrator user interface 900 the specified prompt in area, e.g. the prompt "Uh Oh! It looks like you already have a resource that sounds similar to the one you are trying to create." In area 914 an administrator user can be presented with various options, e.g. rename the candidate resource name, make an alias, or keep the name. If the name is kept, the specific example of administrator user interface 900 interacting with the administrator user in an exemplary development environment is described in further detail in reference to FIGS. 5 and 6, which describe administrator user interface 900 which can be included as part of displayed administrator user interface 900 described in reference to FIG. 4. Dissimilarity scoring as set forth herein can employ e.g. cosine similarity analysis, clustering analysis, affinity propagation, recurrence plot processing, self-similarity matric processing, semantic similarity analysis, and/or string metric analysis.

Referring to administrator user interface 900 as shown in FIG. 4, an administrator user using administrator user interface 900 can be customizing a program provided as a service included among services made available by software services system 160. At some point in the development, administrator user interface 900 can present area 915 that prompts the administrator user to enter a resource name, e.g. a program file name for naming of a custom file, e.g. in this case a program file (however, any file type can be prompted for). The resource name prompted for can be, e.g. a subscriber customized version of a program file in support of a service offering among services offered by software services system 160. In area 916 administrator user interface 900 can prompt for other resource names. For example, in the scenario depicted in FIG. 5 with reference to area 915 a directory name. There may be multiple instances in which an administrator user is prompted by administrator user interface 900 to enter a resource name such as, a file name or a directory name, where the resource name may be referenced in an executed command that includes a command operator and a referenced resource.

Situations where an administrator user is prompted to enter a resource name can include, e.g. where the administrator user is configuring selections for custom access to an offered service of software services system 160 for the specific subscriber ID, e.g. the enterprise of which the administrator user is an agent. An administrator user may also, e.g. wish to upload files, including program files and data files for hosting on software services system 160. According to features herein prompts invoked, e.g. either as a result of an iterative audit process at block 1602 or a result of an on demand check process 1605, can prompt a resource name alteration on the detection of a conflict as set forth herein. Referring to administrator user interface 900, an exemplary prompt is described in greater detail. A prompt can include, e.g. a text based notification displayed on administrator user interface 900 indicating that a resource name has a sound similar to a name that the administrator user is trying to create. The indication that there is another name similar to the name entered as a candidate resource name can be presented with relatively less detail, e.g. might in some instances only indicate that the candidate resource name is invalid which, to an administrator user familiar with system 100 will understand and comprehend as an indication that a name having a similar sound to a candidate name has been identified. Administrator user interface 900 can present alternate options to an administrator user, e.g. renaming the file, making an alias, or keeping the name. If the option to keep the name is selected, system 100 can be configured to restrict the configuration of a directive invoking vocal utterance for directing a command referencing a resource having an associated sound similar to the name identified as presenting potential sound similarity conflict.

With further reference to the flowchart of FIG. 3A, software services system 160 running resource naming process 2603 at audit block 1602 and check processing block 1605 can request and receive from voice profiles area 2503 profile data specifying vocal tendencies of the administrator user who is using administrator user interface 900 and who will be making directive invoking utterances that are configured using system 100. Software services system 160 running resource naming process 2603 can use the profile data in the electronically synthesizing of speech renderings performed at audit block 1602 and check processing block 1605 so that conflicts between a candidate directive invoking vocal utterance and an electronically synthesized speech rendering can be more accurately identified.

The features set forth in reference to the flowchart FIG. 3A involving checks of resource names provide significant advantages in preventing, e.g. the configuring of directive invoking vocal utterances which can possibly implement unwanted functions in a computer system, such as functions destroying the intended function of a computer system, misplacement of resources, and accidental deletion of resources. Additional resource and computer environment protection features are described in connection with FIG. 3B illustrating operation of VEPA 110, interoperating with administrator client computer 130, software services system 160, and VEPA support system 150. Interoperating with administrator client computer 130 and software services system 160.

At blocks 1102 and 1103, VEPA 110 can wait for a developer portal to be activated, e.g. the activation of developer portal process 113 (FIG. 1). The activation of developer portal process 113 can activate an interactive process wherein a user who may be using administrator client computer 130 is prompted by VEPA 110 to enter candidate directive invoking vocal utterances which, upon qualification by VEPA 110 can be established as registered directive invoking vocal utterances for invoking directives in accordance with the voice activated process being configured. Embodiments herein recognize that it can be useful to configure system 100 to be responsive to directive invoking vocal utterances for directing execution of computer system commands where the directive invoking vocal utterances correspond intuitively to text based commands used by developers, i.e. for example in one embodiment system 100 can be configured to be responsive to directive invoking vocal utterances where speech renderings of the utterances have word content in common with word content of text based commands which can be executed in response to the utterances by a computer system, e.g. as defined by one or more software services system 160 and/or local enterprise server 140. In one embodiment, system 100 can be configured so that in response to a directive invoked by a specified vocal utterance, a voice service of software services system 160 can execute a corresponding command having word content in common with word content of the vocal utterance. For example, in an illustrative example, a voice service of software services system 160 can be configured to execute text based commands based on invoking of specified directive including utterances and summarized in Table A.

TABLE A

| Example | Word Content of Directive Invoking Vocal utterances | Word Content of Text Based Command | Description |
|---|---|---|---|
| A | MOVE MYAPP TO NEWDIRECTORY | MOVE MYAPP S:\NEWDIRECTORY | Moves the program file MYAPP to the directory NEWDIRECTORY |
| B | COPY MYAPP TO NEWDIRECTORY | COPY MYAPP NEWDIRECTORY | Moves the program file MYAPP to the directory NEWDIRECTORY |
| C | DELETE MYAPP | DEL MYAPP | Deletes the program file MYAPP |
| D | COMPRESS BIGFILE | COMPRESS BIGFILE | Compresses the file BIGFILE |
| G | CHANGE DIRECTORY TO NEWDIRECTORY | CHDIR NEWDIRECTORY | Changes the current directory to the directory NEWDIRECTORY |

In some use cases, system 100 can be configured so that a directive invoking utterance directs execution of a command having word content identical in to word content of the directive invoking vocal utterance when subject to speech rendering. In some use cases, system 100 can be configured so that a directive invoking utterance directs execution of a command having word content nearly identical to word content of the directive invoking vocal utterance when subject to speech rendering. In some cases, e.g. where a command operator or resource name is difficult to pronounce, or where an administrator user is prompted to enter a candidate directive invoking utterance to avoid conflict, a directive invoking utterance can include one or more word that defines an alias. For providing advantages associated with ease of use of directive invoking vocal utterances, system 100 can be configured with protections so that a directive invoking vocal utterance does not have an unintended consequence, e.g. an unintended execution of a command effecting the wrong file and/or directory, file deletion, or system failure. Accordingly, at block 1104 VEPA 110 can be receiving candidate directive invoking vocal utterances that are subject to checking at block 1105 by VEPA 110.

Commands that can be subject to execution in response to directive invoking utterances herein in one embodiment can include file or directory management commands that are based on Operating System (OS) file or directory management commands, e.g., UNIX OS file or directory management commands, MS-DOS file or directory management commands, WINDOWS file or directory management commands, LINUX file or directory management commands. In one embodiment, commands can be based on Operating System (OS) file or directory management commands by being provided by the commands or e.g. by mapping to Operating System (OS) file or directory management commands with a modest level of abstraction to remove certain syntax requirements.

In one embodiment, while an administrator user is presenting a candidate directive invoking vocal utterance for receipt as voice data by VEPA 110 at block 1104 administrator user 13 can be using administrator user interface 900 featured as described in reference to invoking utterance configurator area 920 of administrator user interface 900.

An administrator user can activate developer portal process 113 using area 921 of utterance configurator area 920. System 100 can be configured so that an administrator user can define in area 922 text defining a computer system command (e.g. specific commands or generic classifications of commands) for which the administrator user would like to establish a corresponding directive invoking vocal utterance to direct execution of the commands. Using area 922 an administrator user can be provided with user-friendly access, e.g. to any resource available within software services system 160 or local enterprise server 140 for example and can associate to such resources a command operator such as CHMOD, GZIP, GUNZIP, PWD, ATTRIB, CHDIR, COPY, DEL, DIR, ERASE, MD, MKDIR, MOVE, RMDIR, REN, RENAME, POPD, PUSHD, RD, REPLACE, TREE, RESTART, DEPLOY, DELETE, CHECK STATUS, or INCREASE MEMORY. In area 922 there can be presented in one embodiment, a list of resources copied from an iteratively updated resource list generated by iterative examining of resources 2602 in one embodiment. The administrator user can associate any available command operator to the resource. System 100 can be configured, so that with the command text identified or selected and established in area 922, VEPA 110 can present a prompt prompting the administrator user to present candidate directive invoking utterances corresponding to the command defined by text which may be entered in area 922 of administrator user interface 900 by an administrator user.

On the entry of a candidate directive invoking vocal utterance by an administrator user at block 1104 VEPA 110 can perform check processing at block 1105. The check processing as indicated by receive and respond block 1609 of software services system 160 can be enhanced via communication with software services system 160. For example, VEPA 110 can request and receive by examination of resources 2602 an updated resources list specifying names of current resources that are available to administrator user under the subscriber ID of the administrator user. The check processing as indicated by receive and respond block 1506 of VEPA support system 150 can be enhanced via communication with VEPA support system 150. For example, VEPA 110 can request and receive from voice profiles area 2503 profile data specifying vocal tendencies of the administrator user 13 who has presented a candidate directive invoking vocal utterance at block 1104. VEPA 110 can then use the profile data in the electronically synthesizing of speech renderings performed at block 1105 so that conflicts between a candidate directive invoking vocal utterance and an electronically synthesized speech rendering can be more accurately identified. VEPA 110 at block 1105 can use information of the voice data of the administrator user received at block 1104 in electronically synthesizing speech renderings so that conflicts between a candidate directive invoking vocal utterance and an electronically synthesized speech rendering can be more accurately identified.

For performing processing at block 1105, VEPA 110 can perform processing similar to the processing described with reference to processing at block 1605 by software services system 160. VEPA 110 at block 1105 can compare the input candidate vocal utterance received at block 1104 to electronically synthesized speech renderings of resource names of the resource list, e.g. by subjecting the input candidate utterance and the electronically synthesized speech renderings to dissimilarity scoring. VEPA 110 at block 1105 can perform comparing the input candidate vocal utterance received at block 1104 to content of prior registered directive vocal utterances. The comparing can include e.g. subjecting the input candidate directive invoking received at block 1104 to prior recorded vocal utterances defining a prior registered directive invoking utterance. The comparing can include e.g. subjecting the input candidate directive invoking received at block 1104 to an electronically synthesized rendering of word content defining a prior registered directive invoking utterance. Dissimilarity scoring as set forth herein can employ e.g. cosine similarity analysis, clustering analysis, affinity propagation, recurrence plot processing, self-similarity matric processing, semantic similarity analysis, and/or string metric analysis. Dissimilarity scoring at block 1105 specified as being performed by VEPA 110 can also or alternatively or in combination be performed by voice service 2601A of software services system 160 and/or VEPA support system 150. In some use cases for performing dissimilarity scoring VEPA 110 can segment an input candidate vocal utterance, a prior recorded vocal utterance, or an electronically synthesized voice rendering, for focusing scoring on most relevant portions of compared content, e.g. resource name content.

Dissimilarity scores below a threshold can be flagged as presenting a conflict. On the identification of a conflict, VEPA 110 at block 1106 can determine that the candidate directive invoking vocal utterance vocalized by an administrator user and received by VEPA 110 at block 1104 presented a conflict and can responsively generate a prompt at block 1107 and a prompt at block 1108. The prompt at block 1107 can be an audio prompt generated by VEPA 110, which an administrator user can hear. The audio generated prompt generated at block 1107 can include an audio indicator to the administrator user 13 that the candidate directive invoking vocal utterance is in conflict with a command, e.g. a command which the computer system provided by software services system 160 and/or local enterprise server 140 is configured to execute. The prompt can provide an indication that the candidate directive invoking utterance sounds confusingly similar to speech rendering of a command which the computer system is configured to execute. Such indication in one embodiment can include the indication that the candidate directive invoking utterance sounds confusingly similar to the prior registered directive invoking utterance. At block 1108, VEPA 110 can send for receipt by administrator client computer 130 at block 1305 prompting information. The prompting information can be prompting information for display on a display of administrator client computer 130 prompting administrator user 13, who is using both administrator client computer 130 and VEPA 110 to revise and present an alternative candidate directive invoking vocal utterance to VEPA 110. As seen by blocks 1104-1108, administrator user 13 can be prompted to iteratively present candidate directive invoking vocal utterances to VEPA 110 until a qualifying utterance is received, processed at block 1105, and determined to be qualified at block 1106. For configuration and development of a candidate directive invoking vocal utterance, qualified for invoking a directive resulting in execution of a command specified by an administrator user, e.g. administrator user 13 in area 922 of administrator user interface 900. In connection with check processing block 1105, there is provided receiving a plurality of computer readable speech renderings respectively corresponding to content of a plurality of text based commands; receiving a candidate audio data set with the candidate audio data set including: (i) an identification of a first text based command that is not included in the plurality of text based commands, and (ii) audio data corresponding to a candidate speech rendering; comparing, by machine logic, the candidate speech rendering to each of the computer readable speech renderings to determine that speech recognition software is likely to misidentify the candidate speech rendering as corresponding to a speech rendering of the plurality of computer readable speech renderings; and responsive to the determination that speech recognition software is likely to misidentify the candidate speech rendering, taking a responsive action.

During an active time of developer portal process 113 an administrator user might be prompted and enabled to establish a plurality of qualified directive invoking vocal utterances for a plurality of different text based commands (e.g. specified in area 922 of administrator user interface 900) capable of being executed by a computer system, e.g. as defined by one or more of software services system 160 and local enterprise server 140. VEPA 110 can be configured so that qualification of a directive invoking utterance enables specific commands or generic classifications of commands. Accordingly, in such an embodiment, on qualification of a candidate directive invoking vocal utterance at block 1106 VEPA 110 at block 1109 can establish one or more directive invoking vocal utterance based on the candidate directive invoking utterance as a registered candidate directive invoking vocal utterance, so that on the conclusion of the current developer portal activation period, system 100 is configured to be responsive to the registered directive invoking vocal utterance. At block 1010, VEPA 110 can determine whether the most previously established directive invoking vocal utterance is a last directive invoking vocal utterance to be registered during a current activation period of developer portal process 113, e.g. as can be determined via examination of configuration data entered by an administrator user using administrator user interface 900. On the determination that a last directive invoking vocal utterance has been established at block 1010, VEPA 110 at block 1111 can proceed to block 1111 to send to voice service 1601A of software services system 160 certain code for receipt and deployment by voice service 1601A of software services system 160 at block 1016.

At block 1111, VEPA 110 can send for deployment to software services system 160 configured code configured during the concluded developer portal activation period to enable a voice service 2601A of services 2601A-2601Z provided by software services system 160 to be responsive to the newly registered directive invoking vocal utterances established during the concluded developer portal activation period.

At block 1610 voice service 2601A of software services system 160 can receive and deploy the code sent at block 1111. Deployment of the code by software services system 160 enables a voice service of software services system 160 to be responsive to directives that are invoked going forward by an administrator user vocalizing registered directive invoking vocal utterances, which as noted can correspond, e.g. in some cases have identical content to text based commands that can be executed for performance of a function by a computer system defined by software services system 160 and/or local enterprise server 140. At the conclusion of blocks 1111 and block 1610, system 100 can be configured to be responsive to directive invoking vocal utterances of an administrator user.

Accordingly, at block 1112 VEPA 110 can receive a directive invoking utterance by an administrator user 13. At block 1113, VEPA 110 can recognize that a compliant directive invoking vocal utterance has been received and can proceed to block 1114 to send a directive invoked by the utterance to software services system 160. Voice service 2601A of software services system 160 can receive the directive transmitted sent at block 1114 and can responsively execute a text based computer system command that has been mapped to the directive invoking utterance from administrator user 13 received at block 1112.

One important aspect as set forth herein is the checking new file names and/or proposed new file names for audio conflicts with other file names that a given user is likely to want to call. In some embodiments, the file names to check the new file against may be limited to some of the pre-existing file names registered in the operating system of the device the user is using (for example, limited to files on the user's device (e.g. administrator client computer 130 and/or local enterprise server) that have certain extensions indicating that they are likely user files rather than system files). In other embodiment, the hunt for file names to check against may be more comprehensive, including one, or more, of the following sources of pre-existing file names: file names of user files on the user's other devices, files to which the user has access to in a cloud environment, e.g., as may be provided under a subscriber ID in one embodiment by software services system 160 where software services system 160 is provided in a cloud environment. In some embodiments of the present invention, an important aspect is that a candidate speech rendering, proposed to be used in creating a new association between a text based command (for example, a file) and a human utterable word/phrase (for example, a file name), is checked to see whether speech recognition software would likely misidentify the candidate speech rendering with other text based command(s) already set up in the computer system. In some of these embodiments, the likely misidentification is determined by: (i) comparing the candidate speech pattern, by machine logic, to speech renderings corresponding to other text based commands that exist in the system; and/or (ii) by analyzing the candidate speech rendering using the algorithms that the speech recognition software uses in performing its speech recognition. Further to item (ii) in the foregoing list, currently conventional speech recognition software uses various kinds of algorithms, such as: (a) simple pattern matching (each spoken word recognized in its entirety); (b) pattern and feature analysis (where each word is broken into bits and recognized from certain predetermined features); (c) language modeling and statistical analysis (use of information about natural language syntax and linguistic probabilities); and/or (d) artificial neural networks.

Figure 7:
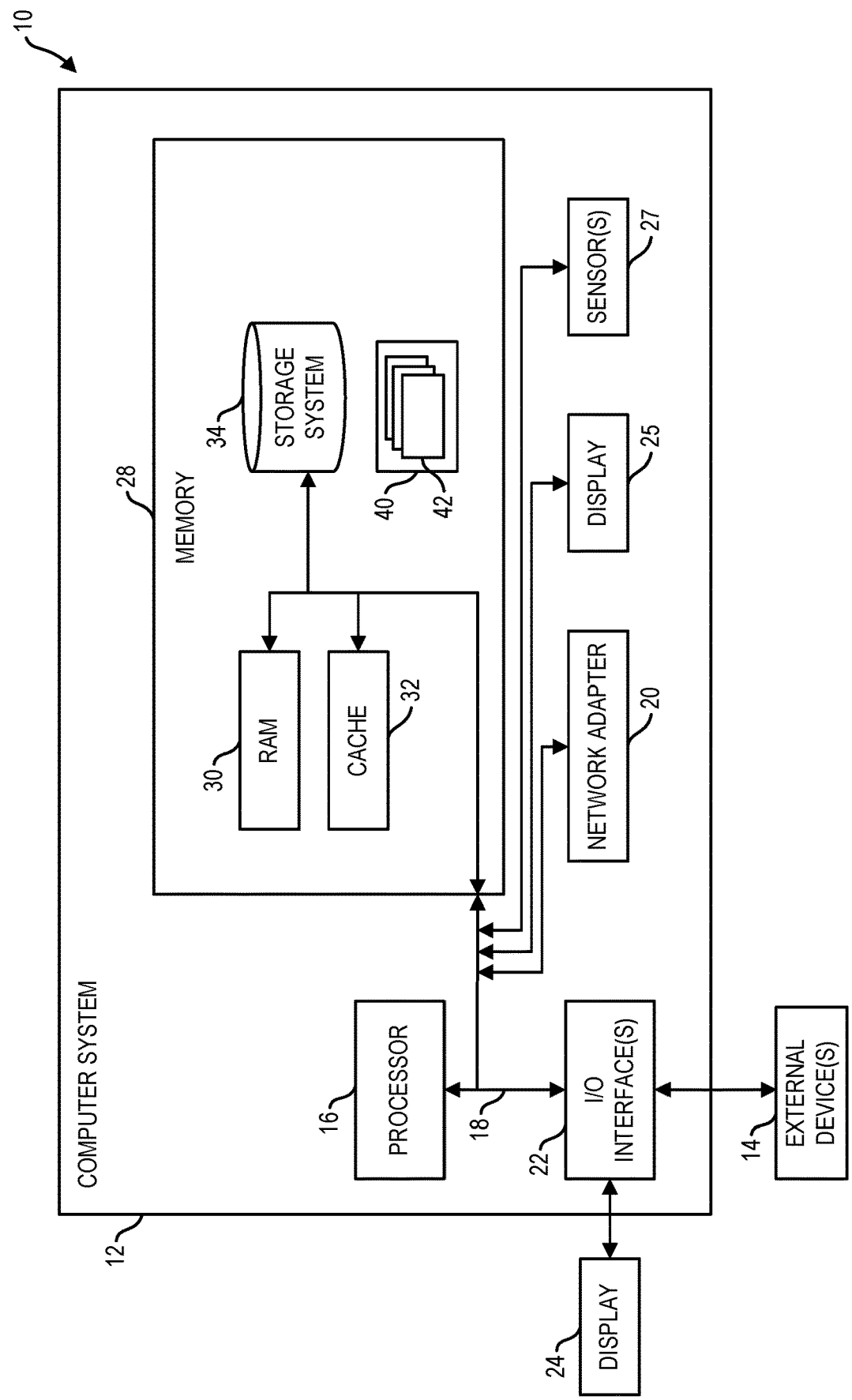
FIG. 7 depicts a computing node according to one embodiment.
Figure 8:
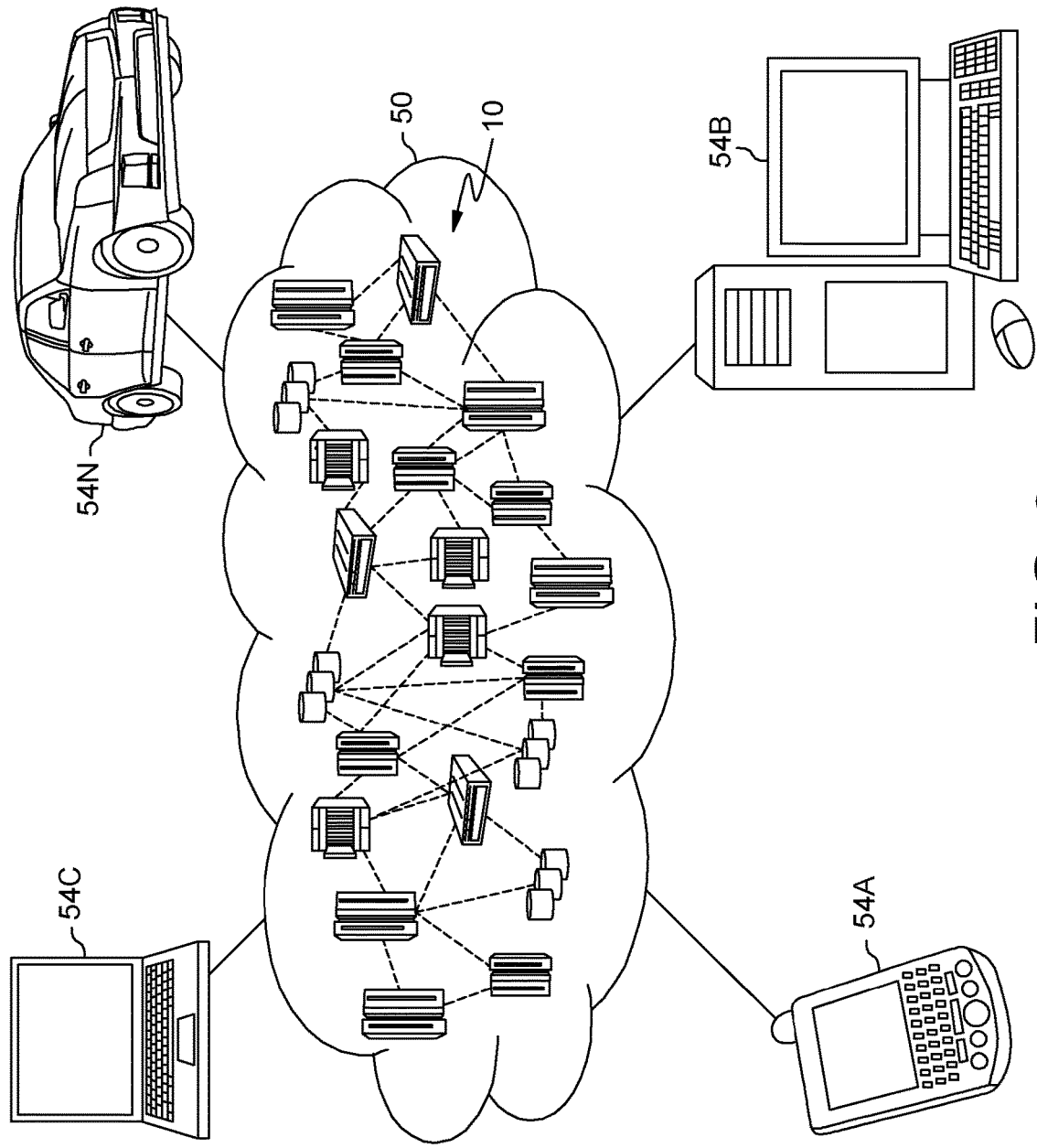
FIG. 8 depicts a cloud computing environment according to one embodiment.
Figure 9:
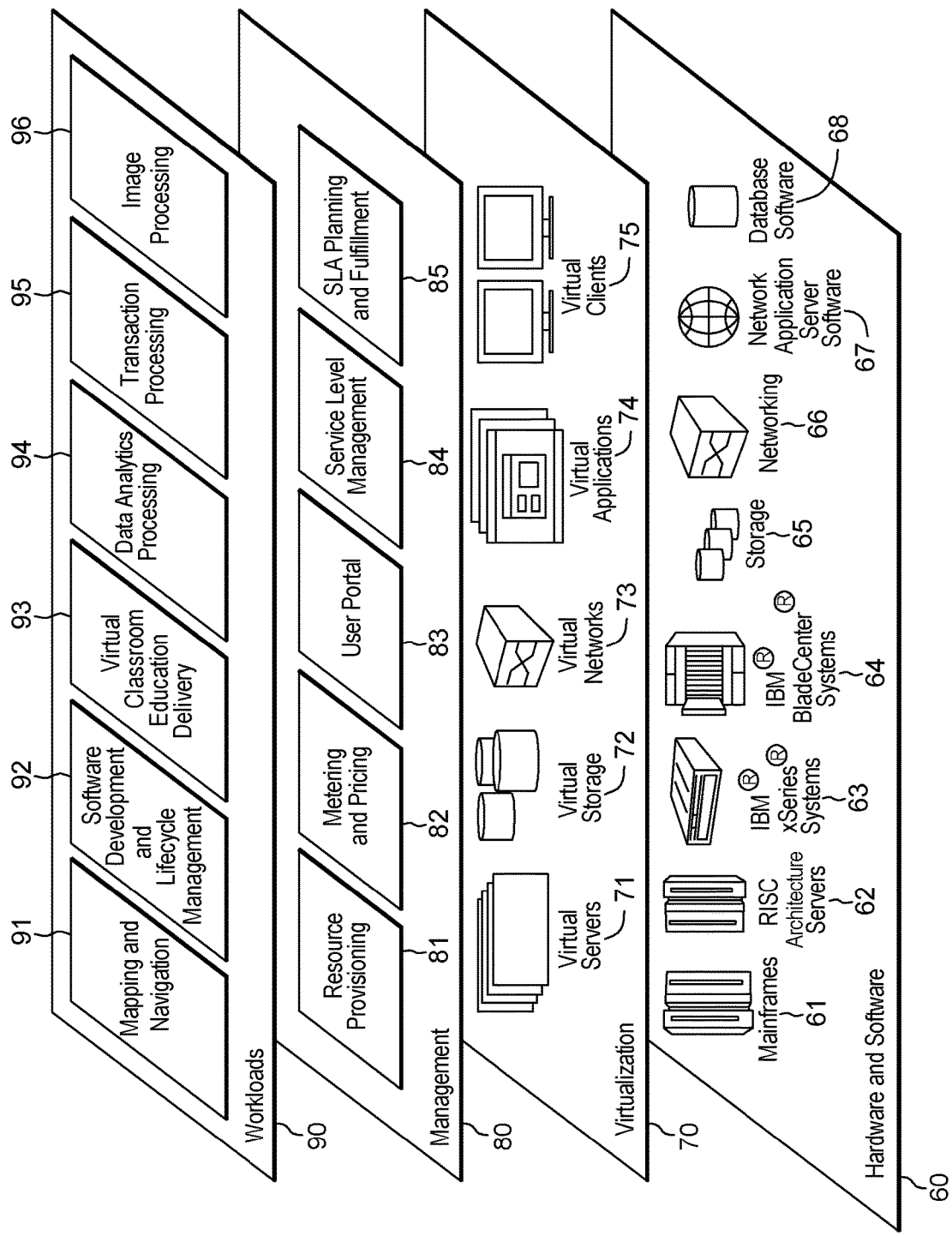
FIG. 9 depicts abstraction model layers according to one embodiment.

Certain embodiments herein may offer various technical computing advantages involving computing advantages to address problems arising in the realm of computer networks. Embodiments herein recognize that operation of a computer system can be improved with improved functions and processes available to an administrator user via voice activation, but recognize a risk in that assets of a computer network including resources can be subject to failure via voice activation functionality. Embodiments herein protect a computer system from system failure, potentially resulting from a directive invoking vocal utterance yielding an unintended response involving, e.g. other than an intended resource such as a file resource or a directory resource. Embodiments herein can feature an interactive and potentially distributed platform that can prompt an administrator user to build a command, such as a file or directory management command, for execution by a computer system subject to activation by directive invoking vocal utterances without risk of system failure or resource deletion resulting from vocal utterances, freeing up the administrator user, e.g., to perform additional actions involving traditional keypad typed text based commands. FIGS. 7-9 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 7, computer system 12 in computing node 10 is shown in the form of a general-purpose computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 8-9.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, VEPA 110 can include one or more computing node 10 and can include one or more program 40 for performing functions described with reference to method 200 of FIG. 2A, and the functions described with reference to VEPA 110 as set forth in the flowchart of FIGS. 3A-3B. In one embodiment, software services system 160 can include one or more computing node 10 and can include one or more program 40 for performing functions described with reference method 250 of FIG. 2B and to functions described with reference to software services system 160 as set forth in reference to the flowchart of FIGS. 3A-3B. In one embodiment, administrator client computer 130 can include one or more computing node 10 and can include one or more program 40 for performing functions described with reference to administrator client computer 130 as set forth in the flowchart of FIGS. 3A-3B. In one embodiment, VEPA support system 150 can include one or more computing node 10 and can include one or more program 40 for performing functions described with reference to VEPA support system 150 as set forth in the flowchart of FIGS. 3A-3B. In one embodiment, the respective components of FIG. 1 that are referenced with differentiated reference numerals can each be computing node based devices and each can include one or more computing node 10 and can include one or more program 40 for performing functions described herein with reference to the respective components.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 8 computing node 10 is described as being implemented in a cloud computing environment and accordingly is referred to as a cloud computing node in the context of FIG. 8.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for facilitating directive invoking utterances directing execution of computer system commands as set forth herein. The processing components 96 can be implemented with use of one or more program 40 described in FIG. 7.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
    receiving, from a user, voice data defining a candidate directive invoking vocal utterance for invoking a directive to execute a first text based command to perform a first computer function of a computer system, wherein the candidate directive invoking vocal utterance includes a word or phrase of the first text based command, wherein the computer system is configured to perform the first computer function in response to the first text based command and wherein the computer system is configured to perform a second computer function in response to a second text based command;
    responsive to determining that the word or phrase of the candidate directive invoking vocal utterance sounds confusingly similar to a speech rendering of a word or phrase defining the second text based command, communicating, to the user, information indicating that the word or phrase of the candidate directive invoking vocal utterance sounds confusingly similar to the speech rendering of the word or phrase defining the second text based command; and
    responsive to the communication of information indicating that the word or phrase of the candidate directive invoking vocal utterance sounds confusingly similar to the speech rendering of the word or phrase defining the second text based command receiving, from the user, a second candidate directive invoking vocal utterance for invoking the directive to execute the first text based command to perform the first computer function.

2. The method of claim 1, wherein the first text based command specifies a command operator and a first resource and wherein the second text based command specifies the command operator and a second resource.

3. The method of claim 1, wherein the method includes for performing the determining electronically synthesizing the speech rendering of the word or phrase defining the second text based command.

4. The method of claim 1, wherein the method includes for performing the determining, electronically synthesizing the speech rendering of the word or phrase defining the second text based command, and wherein the method includes electronically synthesizing the speech rendering of the word or phrase defining the second text based command in dependence on the voice data.

5. The method of claim 1, wherein the method includes for performing the determining, electronically synthesizing the speech rendering of the word or phrase defining the second text based command, and wherein the method includes electronically synthesizing the speech rendering of the word or phrase defining the second text based command in dependence on profile data of the user, the profile data specifying vocal tendencies of the user.

6. The method of claim 1, wherein the method includes, for performing the determining, providing a dissimilarity score between the voice data defining the candidate directive invoking vocal utterance and voice data defining a registered directive invoking vocal utterance.

7. The method of claim 1, wherein the method includes examining resources to generate a list that includes a plurality of resources names that can be referenced in text based commands that the computer system is configured to execute and wherein the determining includes determining whether the word or phrase of the candidate directive invoking vocal utterance sounds confusingly similar to a speech rendering of resource names of the plurality of resource names.

8. The method of claim 1, wherein the method includes examining resources to generate a list that includes a plurality of resources names that can be referenced in text based commands that the computer system is configured to execute, wherein responsive to determining that a word or phrase of the second candidate directive invoking vocal utterance does not sound confusingly similar to electronically synthesized speech renderings of resource names of the plurality of resource names, storing voice process configuration data that establishes a directive invoking vocal utterance based on the second candidate directive invoking vocal utterance as a registered directive invoking vocal utterance.

9. The method of claim 1, wherein the method includes receiving, from the user, entered text that specifies a candidate name for a first resource of the computer system, wherein the computer system is configured to execute a text based command that references an existing resource name of a second resource of the computer system in response to a directive invoked by a directive invoking vocal utterance that specifies an existing resource name; responsive to determining that a speech rendering of the entered text sounds confusingly similar to a speech rendering of an existing resource name of the computer system, communicating, to the user, information indicating that the speech rendering of the entered text sounds confusingly similar to a speech rendering of an existing resource name of the computer system; and responsive to the communication of information indicating that the speech rendering of the entered text sounds confusingly similar to a speech rendering of an existing resource name of the computer system receiving, from the user, second entered text specifying a second candidate resource name for the first resource.

10. The method of claim 1, wherein the first text based command is a file or directory management command that specifies a command operator and a first resource and wherein the second text based command specifies the command operator and a second resource, wherein the first resource and the second resource are selected from the group consisting of file resources and directory resources.

11. A method comprising:
receiving, from a user, entered text that specifies a candidate resource name for a first resource of a computer system, wherein the computer system is configured to execute a text based command that references an existing resource name of a second resource of the computer system in response to a directive invoked by a directive invoking vocal utterance that specifies an existing resource name;
responsive to determining that a speech rendering of the entered text sounds confusingly similar to a speech rendering of an existing resource name, communicating, to the user, information indicating that the speech rendering of the entered text sounds confusingly similar to a speech rendering of an existing resource name; and
responsive to the communication of information indicating that the speech rendering of the entered text sounds confusingly similar to a speech rendering of an existing resource name of the computer system receiving, from the user, second entered text specifying a second candidate resource name for the first resource.

12. The method of claim 11, further comprising responsive to determining that a speech rendering of the second entered text does not sound confusingly similar to a speech rendering of an existing resource name of the computer system, establishing the second candidate resource name as a resource name of the first resource.

13. The method of claim 11, further comprising responsive to determining that a speech rendering of the second entered text does not sound confusingly similar to a speech rendering of an existing resource name of the computer system, establishing the second candidate resource name as a resource name of the first resource, wherein an existing resource name is selected from the group consisting of a file name and a directory name, and wherein the text based command is a file or directory management command.

14. The method of claim 11, wherein the first resource is a new resource available to the user.

15. A method comprising:
receiving a candidate audio data set with the candidate audio data set including: (i) a candidate text proposed for association with a candidate text based command, and (ii) audio data corresponding to a candidate speech rendering of the candidate text;
determining, by machine logic analysis of the candidate speech rendering, that speech recognition software is likely to misidentify utterances of the candidate text as corresponding to a text based command other than the candidate text based command; and
responsive to the determination that speech recognition software is likely to misidentify the utterances of the candidate text, taking a responsive action.

16. The method of claim 15, wherein the candidate text based command corresponds to a computer readable file.

17. The method of claim 15, wherein the responsive action includes sending a notification including information indicating that the candidate text is not recommended for association with the candidate text based command.

18. The method of claim 15, wherein the responsive action includes rejecting the candidate text.

19. The method of claim 15, wherein the determination, by machine logic analysis of the candidate speech rendering, of likely misidentification of utterances of the candidate text includes performing algorithms included in the speech recognition software.

20. The method of claim 15, wherein the determination, by machine logic analysis of the candidate speech rendering, of likely misidentification of utterances of the candidate text includes comparing the candidate speech rendering to a plurality of speech renderings respectively corresponding to already defined text based commands.

* * * * *